Patented Nov. 5, 1940

2,220,854

UNITED STATES PATENT OFFICE 2,220,854

UNSATURATED ESTERS

Harold R. Slagh, Midland, Mich., assignor to The Dow Chemical Company, Midland, Mich., a corporation of Michigan No Drawing. Application September 30, 1937, Serial No. 166,591

6 Claims. (Cl. 260—485)

The present invention relates to certain new unsaturated maleic acid esters having the general formula:

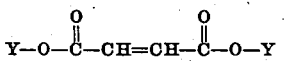

wherein Y represents an aliphatic hydrocarbon radical containing at least one ethylenic linkage. These new compounds are all practically colorless mobile liquids with moderately high boiling points. They are useful as solvents for a variety of materials and especially as modifying agents in the polymerization of vinyl compounds, particularly styrene.

The new unsaturated esters may be prepared by reacting a heavy metal salt, e. g. a lead or silver salt, of an ethylene dicarboxylic acid with an unsaturated aliphatic monohalide. According to the preferred procedure, a mixture of one mol of the salt and an excess, e. g. 2 to 5 mols, of the halide is heated in a closed container for several hours at a temperature of 100° to 200° C. The reaction mixture is then cooled, washed with water, and filtered, and the filtrate is fractionally distilled at reduced pressure to separate the desired ester.

Certain of the new esters, particularly digeranyl maleate, may also be prepared by reacting maleic acid with the desired unsaturated alcohol, e. g. geraniol, as hereinafter illustrated.

The following examples illustrate various ways in which the principle of the invention has been employed, but are not to be construed as limiting the scope thereof:

Example 1

A mixture of 29 grams of maleic acid, 108 grams of geraniol and 300 grams of chlorobenzene was heated at a temperature of 125° to 140° C. for 2 hours. During this time water distilled slowly from the reaction mixture and was condensed. When the reaction was complete the mixture was fractionally distilled at reduced pressure, the fraction distilling at temperatures between 165° and 177° C. at 0.1 inch absolute pressure being collected. This fraction consisted of 35 grams of digeranyl maleate, the formula of which is:

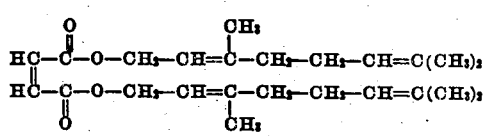

a colorless mobile liquid of perfume-like odor, having a boiling point of 165° to 177° C. at 0.1 inch absolute pressure, and a specific gravity of 1.0005 at 25°/25° C.

Example 2

A mixture of 80 grams of lead maleate and 150 grams of methallyl chloride was heated in a closed container for 4 hours at a temperature of about 140° C. The reaction mixture was then cooled, washed with water, and filtered. The filtrate was fractionally distilled at reduced pressure, the fraction distilling at temperatures between 120° and 128° C. at 0.3 inch absolute pressure being collected. This fraction was redistilled, whereby there was obtained 3 grams of dimethallyl maleate, a light yellow mobile liquid of sharp odor, having a boiling point of about 120° to 128° C. at 0.3 inch absolute pressure and a refractive index of 1.4714 at 20° C.

Other unsaturated esters having the general formula hereinbefore presented may also be prepared by the methods illustrated in the foregoing detailed examples, e. g., di(penten-1-yl-5) maleate, di-citronellyl maleate, etc. Such compounds are usually colorless mobile liquids and are useful as modifying agents in the polymerization of vinyl compounds.

Other modes of applying the principle of the invention may be employed, change being made as regards the details hereinbefore disclosed, provided the products stated by any of the following claims or the equivalent of such stated products be employed.

I therefore particularly point out and distinctly claim as my invention:

1. Dimethallyl maleate, a slightly yellowish mobile liquid having a boiling point of about 120° to 128° C. at 0.3 inch absolute pressure and a refractive index of about 1.4714 at 20° C.

2. Digeranyl maleate, a colorless mobile liquid having a boiling point of about 165° C. to about 177° C. at 0.1 inch absolute pressure and a specific gravity of about 1.0005 at 25°/25° C.

3. A maleic acid ester having the general formula

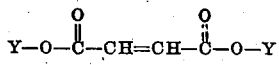

wherein Y represents an aliphatic hydrocarbon radical containing at least one ethylenic linkage and not less than 4 nor more than 10 carbon atoms.

4. The method of preparing a dimethallyl ester of maleic acid which comprises reacting a heavy metal salt of said acid with a methallyl halide.

5. The method of preparing dimethallyl maleate which comprises reacting lead maleate with methallyl chloride.

6. A di-ester of maleic acid with an alcohol selected from the group consisting of methallyl alcohol, pentene-1-ol-5, geraniol and citronellol.

HAROLD R. SLAGH.